United States Patent
Sussek

(10) Patent No.: US 11,472,394 B2
(45) Date of Patent: Oct. 18, 2022

(54) METHOD FOR DETERMINING THE BRAKING FORCE IN AN ELECTROMECHANICAL BRAKE DEVICE HAVING AN ELECTRIC BRAKE MOTOR

(71) Applicant: Robert Bosch GmbH, Stuttgart (DE)

(72) Inventor: Ullrich Sussek, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 806 days.

(21) Appl. No.: 16/430,952

(22) Filed: Jun. 4, 2019

(65) Prior Publication Data

US 2020/0001852 A1    Jan. 2, 2020

(30) Foreign Application Priority Data

Jun. 27, 2018   (DE) .................... 10 2018 210 511.1

(51) Int. Cl.
| | |
|---|---|
| *B60T 17/22* | (2006.01) |
| *B60T 13/74* | (2006.01) |
| *G01L 5/28* | (2006.01) |
| *B60T 1/06* | (2006.01) |
| *B60T 13/58* | (2006.01) |

(52) U.S. Cl.
CPC .......... *B60T 17/221* (2013.01); *B60T 13/741* (2013.01); *G01L 5/28* (2013.01); *B60T 1/065* (2013.01); *B60T 13/588* (2013.01); *B60T 2270/402* (2013.01)

(58) Field of Classification Search
CPC ........ B60T 17/221; B60T 17/22; B60T 7/042; B60T 2270/402; B60T 13/588; B60T 1/065; B60T 13/741; F16D 65/183; F16D 55/226; F16D 2066/005; G01L 5/28
See application file for complete search history.

(56) References Cited

U.S. PATENT DOCUMENTS

| | | | |
|---|---|---|---|
| 2015/0217750 A1* | 8/2015 | Sussek | B60T 17/221 701/70 |
| 2015/0239439 A1* | 8/2015 | Sussek | B60T 8/172 701/70 |
| 2019/0217836 A1* | 7/2019 | Bast | B60T 17/18 |

FOREIGN PATENT DOCUMENTS

DE    10 2006 052 810 A1    5/2008

* cited by examiner

*Primary Examiner* — Behrang Badii
(74) *Attorney, Agent, or Firm* — Maginot, Moore & Beck LLP

(57) ABSTRACT

In the case of a method for determining the braking force in an electromechanical brake device having a brake motor, the braking force is determined from a prevailing load current that is determined from the difference between the measured motor current and the calculated switch-on current.

11 Claims, 3 Drawing Sheets

METHOD FOR DETERMINING THE BRAKING FORCE IN AN ELECTROMECHANICAL BRAKE DEVICE HAVING AN ELECTRIC BRAKE MOTOR

This application claims priority under 35 U.S.C. § 119 to application no. DE 10 2018 210 511.1, filed on Jun. 27, 2018 in Germany, the disclosure of which is incorporated herein by reference in its entirety.

TECHNICAL FIELD

The disclosure relates to a method for determining the braking force in an electromechanical brake device having an electric brake motor.

BACKGROUND

A method for estimating the force development in an electromechanical brake device is described in DE 10 2006 052 810 A1. In this case, an electric brake motor of the brake device is actuated, as a result of which a brake piston that is a carrier of a brake lining is urged against a brake disc.

In the case of the method described in DE 10 2006 052 810 A1, in order to achieve a precise as possible estimation of the force development, said force being exerted as the electric brake motor is actuated, a total electrical resistance and the motor constant of the electric motor are determined as characteristic variables and their prevailing temperature is taken into consideration.

SUMMARY

The method in accordance with the disclosure relates to determining the braking force in an electromechanical brake device in a vehicle, wherein the electromechanical brake device comprises an electric brake motor that influences a brake piston that is a carrier of a brake lining against a brake disc in order to generate braking force.

The electromechanical brake device may be integrated into a wheel brake unit that is also part of the vehicle hydraulic brake. In this case, the brake piston is influenced by braking pressure as the vehicle hydraulic brake is actuated and said brake piston is urged against the brake disc. The vehicle hydraulic brake and the electromechanical brake device form a common brake system.

The braking force in the electromechanical brake device may be determined with a greater degree of accuracy by means of the method in accordance with the disclosure even in the event that at the point in time in which the brake motor is switched on the brake lining on the brake piston already lies against the brake disc and is urged against the brake disc. If the brake motor is actuated in this situation in order to move the brake piston further against the brake disc so as to generate braking force, then usually initially in the first split seconds a clearance in the operative chain between the electric brake motor and the brake piston is eliminated and a force is built up following this. At the same time, a current peak in the switch-on current of the electric motor is still effective; in this situation the electric motor has not yet achieved its maximum idling rotational speed. The current that builds up the force is superimposed on the switch-on current with the result that it is not possible to evaluate the prevailing motor current directly for determining the braking force.

It is possible by means of the method in accordance with the disclosure for the current peaks that occur in the switch-on current to be filtered out from the prevailing motor current with the result that a current portion that is described as a load current is available and may be used to determine the prevailing braking force with a greater degree of accuracy. For this purpose, the switch-on current is calculated and subtracted from the prevailing motor current that is measured. The difference between the motor current and the switch-on current represents the prevailing load current that corresponds with the braking force that is generated as the electrical brake motor is actuated and the braking force may be determined from said load current.

The knowledge of the prevailing braking force that is generated by the electric brake motor of the electromechanical brake device may be used advantageously in different situations. If by way of example the electromechanical brake device is used to generate additional braking force in the drive mode, for example in the event of a failure of a system that boosts the braking force in the vehicle hydraulic brake, then it is possible via controlling the electromechanical brake device to ensure that an anti-lock braking system or another control system still functions. Where appropriate, an upper limit is specified for the electromechanically generated braking force.

In accordance with one advantageous embodiment, the switch-on current is calculated as a function of a motor time constant that depends in particular upon the motor resistance, the motor constants and the armature mass inertia of the electrical brake motor. The switch-on current may be determined as function of the motor time constants using a recursive algorithm in which the prevailing switch-on current is determined as a function of the switch-on current that is determined in a preceding calculation step by taking into consideration the motor time constants. The time difference between two successive calculation steps represents a cycle duration within a calculation cycle from calculation step to calculation step. The switch-on current is determined recursively in this manner.

The initial value of the switch-on current at the point in time 0 of the recursive algorithm may be determined in accordance with a further advantageous embodiment from a measured current value from the falling edge of the switch-on current progression. Consequently, all the information for the recursive algorithm is available for determining the switch-on current, wherein the switch-on current is continuously repeatedly calculated in discrete time steps. The switch-on current that is determined in the recursive algorithm is a current value that is determined within the framework of a model calculation.

The load current may thus be determined during continuous measurements of the current from the prevailing measured motor current of the brake motor by subtracting the calculated switch-on current. The motor torque may be determined from the load current by means of multiplying said load current by the motor constant and the braking force may be calculated from said motor torque from a kinematic equation in the knowledge of the radial spacing between the motor longitudinal axis and the engagement point of the brake lining on the brake disc.

In accordance with a further advantageous embodiment, the motor resistance and the motor constant are also calculated. As a consequence, it is possible to take into consideration factors such as in particular temperature that influence the motor resistance and the motor constant. The motor resistance and the motor constants are preferably calculated during a preceding procedure of switching on the brake motor so as to move the brake piston toward the brake disc. This approach has the advantage that the motor resistance and the motor constant are determined with a high degree of accuracy and they are available for the calculation of the braking force.

The disclosure relates furthermore to a method for providing a braking force in an above-described electromechanical brake device having an electric brake motor, wherein the described method for determining the braking force is used. In the case of the method for providing the braking force, the electric brake motor is controlled and moved in the direction toward the brake disc so as to generate a greater braking force or is moved in the release direction, in other words in the opposite direction thereto, so as to reduce the braking force in order to set a desired braking force level.

The disclosure relates furthermore to a control device for controlling the adjustable components of the electromechanical brake device with which the above-described methods are performed. Where appropriate, the control device may be part of a brake system in the vehicle. Control signals for controlling the adjustable components of the brake device, in particular of the electric brake motor, are generated in the control device.

The disclosure relates in addition to an electromechanical brake device for a vehicle that is used advantageously for holding the vehicle at a standstill but where appropriate it may also be used to reduce the speed of the vehicle from higher speeds. The electromechanical brake device comprises as described above an electric brake motor, a brake piston, which is a carrier for a brake lining, and also a brake disc against which the brake piston is moved together with the brake lining, and also an above-described control device for controlling the adjustable components.

The electromechanical brake device may where appropriate together with a vehicle hydraulic brake form a brake system in the vehicle.

The method for determining the braking force renders it possible to determine with a greater degree of accuracy the braking force in the event that at the point in time in which the brake motor is switched on and in particular as the brake piston is moved in the direction toward the brake disc the brake lining is already in contact with the brake disc so as to increase the braking force. However, the method may also be used in the event that at the point in time in which the brake motor is switched on the brake lining is at a distance from the brake disc.

BRIEF DESCRIPTION OF THE DRAWINGS

Further advantages and expedient embodiments are apparent in the description of the figures and the drawings. In the drawings.

DETAILED DESCRIPTION

Figure 1:
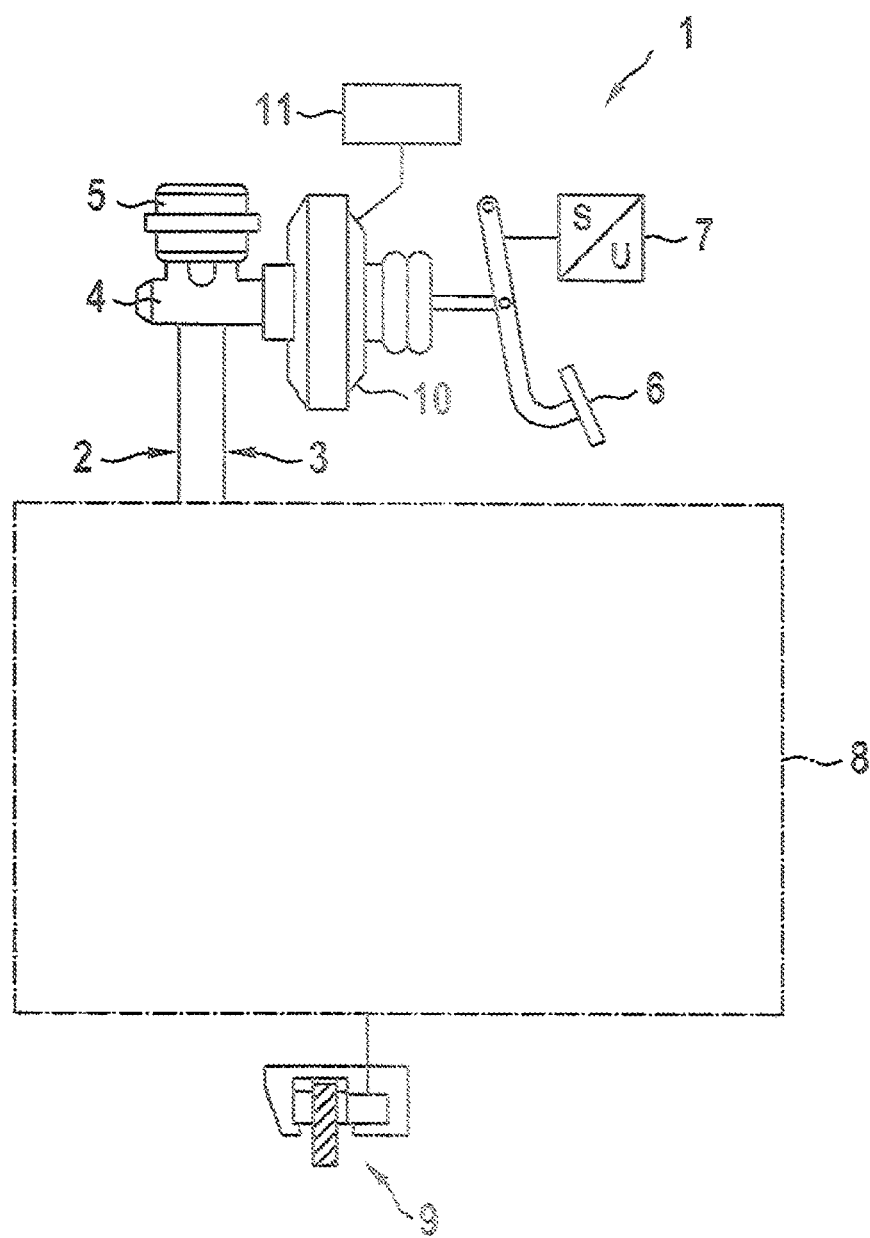
FIG. 1 illustrates a schematic view of a vehicle hydraulic brake, wherein the wheel brake devices of the vehicle brake are equipped with electromechanical brake devices having in each case an electric brake motor.

In the figures, like components are provided with like reference numerals.

The brake system illustrated in FIG. 1 for a vehicle comprises a dual-circuit vehicle hydraulic brake 1 having a first hydraulic brake circuit 2 and a second hydraulic brake circuit 3 so as to supply and control wheel brake devices 9 on each wheel of the vehicle with a brake fluid that is subjected to hydraulic pressure. The two brake circuits 2, 3 are connected to a common master brake cylinder 4 that is supplied with brake fluid via a brake fluid storage device 5. The master brake cylinder piston in the master brake cylinder 4 is actuated by the driver via the brake pedal 6, the pedal travel created by the drive is measured via a pedal travel sensor 7. A braking force booster 10, which comprises by way of example an electric motor that preferably actuates the master brake cylinder 4 (iBooster) via a gear, is located between the brake pedal 6 and the master brake cylinder 4.

The vehicle hydraulic brake 1 may comprise in addition or as an alternative to the iBooster an integrated electro-hydraulic brake unit having a plunger that is driven by an electric motor. The vehicle brake 1 is advantageously configured as a brake-by-wire system, wherein actuation of the brake pedal causes the hydraulic volume to be displaced into a pedal travel simulator. The brake pressure accordingly builds up following the brake pedal actuation as a result of the plunger being actuated by means of an electric motor. In the event of a failure of the electro-hydraulic brake unit, separating valves that connect the brake circuit to the master brake cylinder 4 are opened with the result that as the driver actuates the brake pedal a direct hydraulic influence is exerted on the wheel brake devices 9.

The adjustment movement of the brake pedal 6 measured by the pedal travel sensor 7 is transmitted as a sensor signal to a control device 11 in which control signals for controlling the braking force booster 10 are generated. The wheel brake devices 9 are supplied with brake fluid in each brake circuit 2, 3 via different switching valves that together with other components are part of a hydraulic brake system 8. Furthermore, the hydraulic brake system 8 comprises a hydraulic pump that is a component of an electronic stability program (ESP).

The two hydraulic brake circuits 2 and 3 of the dual-circuit vehicle brake 1 are by way of example allocated diagonally with the result that the first brake circuit 2 supplies brake fluid by way of example to the two wheel brake devices 9 on the left-hand front wheel and on the right-hand rear wheel and the second brake circuit 3 supplies brake fluid to the two wheel brake devices 9 on the right-hand front wheel and on the left-hand rear wheel. Alternatively, it is also possible to allocate the two hydraulic brake circuits 2 and 3 of the dual-circuit vehicle brake 1 to the wheel brake devices on the front axle and the wheel brake devices on the rear axle.

Figure 2:
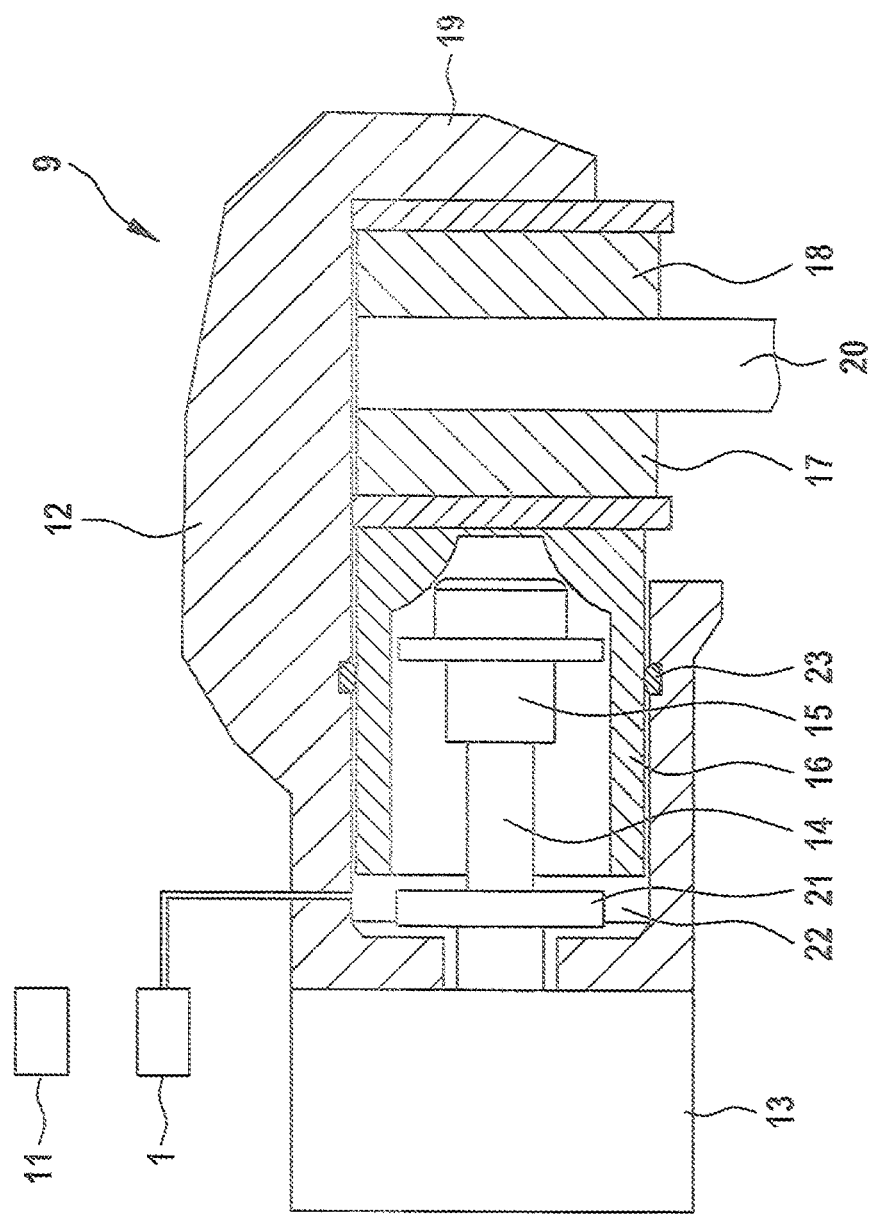
FIG. 2 illustrates a sectional view through an electromechanical brake device having an electric brake motor.

FIG. 2 illustrates in detail the wheel brake device 9 that is arranged on a wheel on the rear axle of the vehicle. The wheel brake device 9 is part of the vehicle hydraulic brake 1 and is supplied with brake fluid 22 from a brake circuit 2, 3. The wheel brake device 9 comprises moreover an electromechanical brake device that as a locking brake holds the vehicle at a standstill but also may be used to decelerate the vehicle during a movement of the vehicle.

The electromechanical brake device comprises a brake caliper 12 having a claw 19 that engages over a brake disc 20. The brake device comprises as an actuator a DC electric motor as a brake motor 13, the rotor shaft of which drives a spindle 14 in a rotary manner and a spindle nut 15 is mounted on said spindle in such a manner as not to rotate. As the spindle 14 rotates, the spindle nut 15 is moved in an axial manner. The spindle nut 15 moves within a brake piston 16 that is a carrier of a brake lining 17, said brake lining being urged by the brake piston 16 against the brake disc 20. A further brake lining 18 that is held on the claw 19 in a location-fixed manner is located on the opposite side of the brake disc 20. The brake piston 16 is sealed on its outer side via a circumferential sealing ring 23 in a pressure-tight manner with respect to the receiving housing.

As the spindle 14 rotates, the spindle nut 15 is able to move axially forward within the brake piston 16 in the direction toward the brake disc 20 and accordingly as the spindle 14 rotates in the opposite direction said spindle nut moves axially backward until it arrives at a stop 21. In order to generate a clamping force, the spindle nut 15 impinges against the inner end face of the brake piston 16 as a result of which the brake piston 16 that is mounted in an axially displaceable manner in the brake device and comprises the brake lining 17 is urged against the facing end surface of the brake disc 20.

In order to generate the hydraulic braking force, the hydraulic pressure of the brake fluid 22 from the vehicle hydraulic brake 1 acts on the brake piston 16. The hydraulic pressure may also be effective in a supporting role when the vehicle is at a standstill as the electromechanical brake device is actuated with the result that the entire braking force is composed of the portion that is provided by the electric motor and the portion that is provided hydraulically. When the vehicle is travelling, so as to perform a braking procedure either only the vehicle hydraulic brake is active or both the vehicle hydraulic brake and also the electromechanical brake device are active or only the electromechanical brake device is active in order to generate the braking force. The control signals for controlling both the adjustable components of the vehicle hydraulic brake 1 and also of the electromechanical wheel brake device 9 are generated in the control device 11.

The wheel brake device 9 that is illustrated in FIG. 2 and is equipped in addition with the electromechanical brake device having the brake motor 13 is preferably located on the rear axle of the vehicle. The electric brake motors 13 may be controlled independently of one another in the two wheel brake devices 9 on the rear axle.

Figure 3:
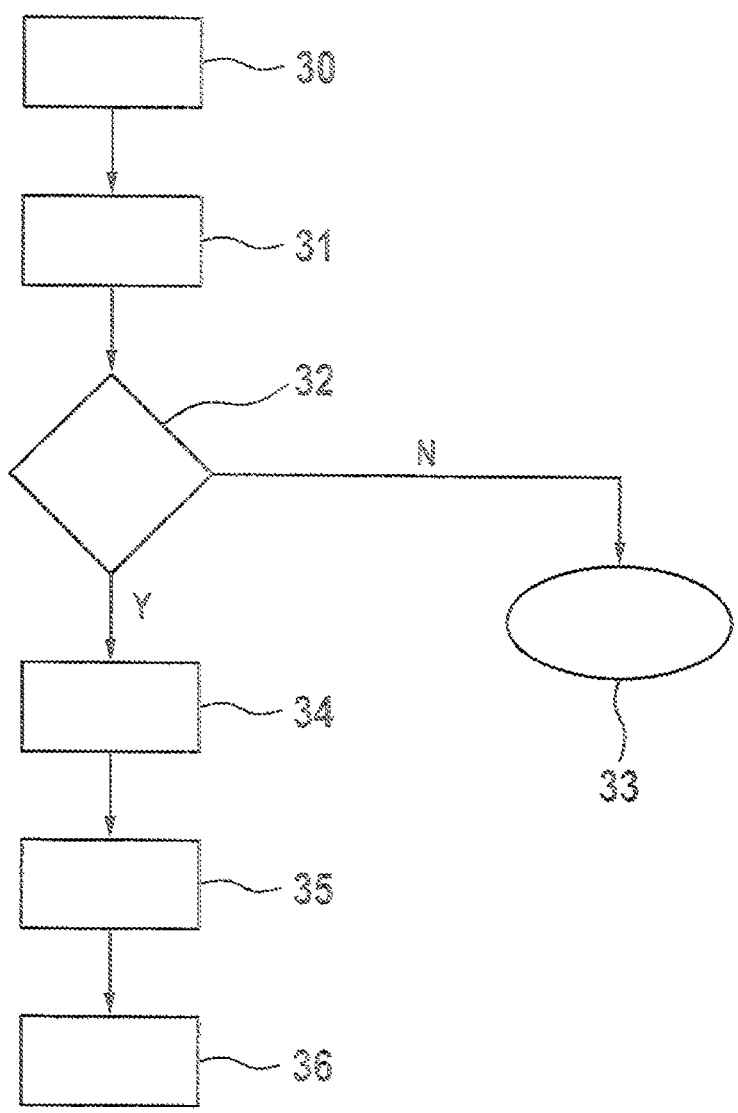
FIG. 3 illustrates a flow diagram showing method steps for determining the braking force in an electromechanical brake device.

FIG. 3 illustrates a flow diagram showing the method steps for determining the braking force in an electromechanical brake device in the event that at the point in time in which the brake motor is switched on the brake lining on the brake piston already lies against the brake disc.

Initially, in a first method step 30 during a first procedure of switching on the electric brake motor during which the brake piston is moved toward the brake disc, the motor resistance $R_M$ and the motor constant $K_M$ are determined during the current peak of the switch-on current. The subsequent second step 31 characterizes a second sequential procedure of switching on the brake motor, wherein during this switch-on procedure the current progression of the switch-on current initially experiences a current peak again in a manner known per se. In the next step 32, it is queried whether at the point in time of the switch-on procedure (step 31) the brake lining on the end face of the brake piston is in contact with the brake disc. If this is not the case, the method follows the NO-branch ("N") to the step 33 and the method is terminated.

If on the other hand the condition is fulfilled and the brake lining on the end face of the brake piston is consequently in contact with the brake disc, the method follows the YES-branch ("Y") to the next step 34. In this case, the switch-on peak and build-up of force are superimposed on one another in the current progression of the motor current. In order to determine the magnitude of the braking force, it is necessary to determine the engine torque from which it is possible to determine the braking force in accordance with a kinematic equation. The motor torque is calculated by multiplying the motor constants $K_M$ by a load current $I_F$:

$$M_{Mot} = K_M \cdot I_F$$

The load current $I_F$ is the particular portion of the entire current consumption of the electric brake motor that is responsible for the brake lining being pressed against the brake disc. The load current $I_F$ is calculated from the difference between the measured, prevailing motor current $I_{Mot}$ of the brake motor and a calculated switch-on current $I_{peak}$ in accordance with:

$$I_F = I_{Mot} - I_{peak}$$

The prevailing motor current $I_{Mot}$ is available from measurements. The switch-on current $I_{peak}$ that occurs directly after the electric brake motor is switched on may be calculated in a recursive manner in accordance with:

$$I_{peak,n+1} = I_{peak,n} \frac{T_{cyc}}{T_{cyc} + \tau} \cdot (I_L - I_{peak,n})$$

The index n therein represents a discrete point in time within a calculating cycle, wherein the cycle duration between two sequential discrete points in time n, n+1 is represented by $T_{cyc}$.

The motor time constant $\tau$ may be calculated from the equation:

$$\tau = \frac{R_M \cdot J}{K_M^2}$$

in dependence upon the motor resistance $R_M$, the armature mass inertia J and the motor constants $K_M$.

If the query in the method step 32 confirms that the brake lining is in contact with the brake disc, the YES-branch is followed and in step 34 the prevailing motor current $I_{Mot}$ is measured. Subsequently, as described above, in the next step 35 the switch-on current $I_{peak}$ may be calculated in the recursive algorithm. The switch-on current $I_{peak,n+1}$ at the point in time=I is calculated on the basis of the switch-on current $I_{peak,n}$ at the preceding point in time n.

The initial value $I_{peak,0}$ of the switch-on current is available at the point in time 0 for the start of the recursive algorithm, wherein the initial value $I_{peak,0}$ may be determined from the falling edge of the switch-on current from a measurement.

Following this, as described above, the load current $I_F$ is calculated from the difference between the measured motor current $I_{Mot}$ and the calculated switch-on current $I_{peak}$, following which the motor torque may be calculated by multiplying the load current $I_F$ by the motor constant. The motor torque $M_{Mot}$ is the basis for determining the braking force by taking into consideration a kinematic equation.

What is claimed is:

1. A method for determining a braking force in an electromechanical brake device having an electric brake motor configured to urge a brake piston against a brake disc, the method comprising:
   determining a prevailing load current from a difference between a measured prevailing motor current of the brake motor and a calculated switch-on current; and
   determining a braking force from the prevailing load current, in response to a brake lining on the brake piston lying against the brake disc at a point in time in which the brake motor is switched on.

2. The method according to claim 1 further comprising: calculating the switch-on current as a function of a motor time constant.

3. The method according to claim 2 further comprising: calculating a motor time constant based on a motor resistance, motor constants, and an armature mass inertia using the equation:

$$\tau = \frac{R_M \cdot J}{K_M^2},$$

where $\tau$ is the motor time constant, $R_M$ is the motor resistance, $K_M$ is the motor constants, and $J$ is the armature mass inertia.

4. The method according to claim 2, the calculating the switch-on current further comprising: calculating the switch-on current using a recursive algorithm based on the motor time constant.

5. The method according to claim 4, the calculating the switch-on current further comprising: calculating the switch-on current based on the motor time constant using the equation:

$$I_{peak,n+1} = I_{peak,n} \frac{T_{cyc}}{T_{cyc} + \tau} \cdot (I_L - I_{peak,n}),$$

wherein $I_{peak}$ is the switch-on current, n represents a point in time in a calculating cycle of the recursive algorithm, $\tau$ is the motor time constant, $T_{cyc}$ represents a cycle duration of the calculating cycle, and $I_L$, represents an idling current.

6. The method according to claim 4 further comprising: determining an initial value of the switch-on current at the point in time zero in the recursive algorithm based on a falling edge of the switch-on current.

7. The method according to claim 1 further comprising: calculating a motor resistance and a motor constant during a preceding procedure of switching on the brake motor to create a movement of the brake piston toward the brake disc.

8. The method according to claim 1 further comprising: providing braking force with the electromechanical brake device according to the the determined braking force.

9. A control device for controlling adjustable components of an electromechanical brake device having an electric brake motor configured to urge a brake piston against a brake disc, the control device being configured to:
determine a prevailing load current from a difference between a measured prevailing motor current of the brake motor and a calculated switch-on current; and
determine a braking force from the prevailing load current, in response to a brake lining on the brake piston lying against the brake disc at a point in time in which the brake motor is switched on.

10. An electromechanical brake device for a vehicle, the electromechanical brake device comprising:
an electric brake motor configured to move a brake piston in a direction toward a brake disc; and
a control device for controlling adjustable components of the electromechanical brake device, the control device being configured to:
determine a prevailing load current from a difference between a measured prevailing motor current of the brake motor and a calculated switch-on current; and
determine a braking force from the prevailing load current, in response to a brake lining on the brake piston lying against the brake disc at a point in time in which the brake motor is switched on.

11. The electromechanical brake device according to claim 10, wherein the electromechanical brake device is a locking brake configured to hold the vehicle in a standstill.

\* \* \* \* \*